United States Patent

[11] 3,628,283

[72] Inventor Henri Mizoule
Sevres, France
[21] Appl. No. 42,421
[22] Filed June 1, 1970
[45] Patented Dec. 21, 1971
[73] Assignee Mattel, Inc.
Hawthorne, Calif.

[54] ELECTRONIC CONTROL DEVICE SENSITIVE TO ELECTROSTATIC CHARGE FOR CONTROLLING ELECTRICALLY OPERATED TOYS AND THE LIKE

8 Claims, 6 Drawing Figs.

[52] U.S. Cl. .................................................. 46/233, 307/308
[51] Int. Cl. .................................................. A63h 33/26
[50] Field of Search .................................................. 46/233, 172, 236, 227, 228; 307/308

[56] References Cited

UNITED STATES PATENTS 3,239,961 3/1966 Forkner .................................................. 46/233 X

*Primary Examiner*—Louis G. Mancene
*Assistant Examiner*—D. L. Weinhold
*Attorney*—Seymour A. Scholnick

ABSTRACT: An electronic control device utilizing a field effect transistor or similarly operating element wherein its input or gate electrode is connected to an antenna and its output or channel portion is connected in series with a load impedance across a DC current source. A utilization portion including a current activated device, which may be a part of an animation portion of a toy, such as a relay, is also connected across the current source in parallel with the transistor's channel portion and is further coupled to the output of the transistor and responsive to its conductive state for activating the current activated device.

INVENTOR
HENRI MIZOULE
BY Max E. Shirk
ATTORNEY

INVENTOR
HENRI MIZOULE
BY Max E. Shirk
ATTORNEY

ELECTRONIC CONTROL DEVICE SENSITIVE TO ELECTROSTATIC CHARGE FOR CONTROLLING ELECTRICALLY OPERATED TOYS AND THE LIKE

BACKGROUND OF THE INVENTION

The background of the invention will be set forth in two parts.

1. Field of the Invention

The present invention pertains generally to the field of electronic control circuitry and more particularly to a novel means for remotely controlling electrical devices such as electrically operated toys, games, and the like.

2. Description of the Prior Art

Means for controlling the operation of electrical devices by remote control and without the use of electrical cabling are well known.

Some of the earliest developed types of such systems utilized a vapor electric discharge tube as described for example in U.S. Pat. No. 1,900,596. A tube was connected in series with a source of potential and the electrical mechanism to be controlled. The control grid of the discharge tube was biased to just above cutoff and was also connected to a sheet of conductive material whereby the impedance of the grid circuit was changed by the capacity of a portion of a person's body, such as a hand coming into proximity to the conductive sheet. In this way, a more positive potential was impressed on the grid circuit to allow the tube to conduct and complete the electrical path between the electrical device and its input source. Although constituting a significant advancement of the art at that time, this type of control circuitry is now considered very insensitive and erratic in operation due to the characteristics of such grid control gas discharge tubes.

A later development in this area was the use of a pair of relatively large plates of conductive material which were spaced from each other and each connected in series with one leg of a capacitance bridge circuit. Any body brought into the vicinity of the plates could disturb the electric field set up between the plates and unbalance the bridge to provide an output or control signal. The sensitivity of this device was found not to be too great and it was also not reliable because of the critical requirements of bridge balance being easily upset from causes other than a capacitance than in the conductive plate area. For example, a temperature change could effect any one of many components of the bridge and cause it to be come unbalanced and thereby excite a controlled circuit.

More recently, control devices utilizing oscillating circuitry were developed. One such type of device would either commence or cease oscillation when the capacitance of a sensing component in the oscillator circuitry was caused to change by the presence of a person's hand or other object, for example. Another type included frequency sensing circuitry which caused a in oscillator frequency through a capacitive change in a sensing element. As still a further type of this type of device used two oscillators operating at closely related but different frequencies to provide a beat frequency which was detected by a discriminator circuit. Any change in operating frequency of one of the oscillators brought about by the proximity of a body near a sensing element attached to a frequency determining component of such oscillator would cause the beat frequency to deviate out of the discriminator's pass band and cause a controlled device to be activated. All of these techniques have proved to be unreliable due to the characteristic instability of high-frequency oscillators having many uncontrolled parameters Also, a further disadvantage of these devices is the generation of radio frequency energy which could cause interference with other electrical devices. Such as radio and television receivers.

In the past, one or more of these techniques has been used to control toys and games used for entertainment purposes. For example, toys have been made to move or otherwise be controlled by such proximity sensitive devices, but all have proved to be unreliable, expensive and in some cases objectionable where radio wave interference was generated.

SUMMARY OF THE INVENTION

In view of the foregoing disadvantages characteristic of the prior art, it is a primary objective of the present invention to provide a new and improved electronic control device not subject to these disadvantages and having a unique electrostatic charge sensitive element.

Another object of the present invention is to provide an inexpensive and reliable electronic control device for activating electrically operated portions of toys.

Still another object of the present invention is to provide a simple, relative lightweight and small electronic control circuitry readily carried within small toys such as dolls and the like.

Yet another object of this invention is to provide an electronic control device substantially insensitive to stimuli other than a displacement of electrostatic charge in the vicinity thereof.

It is also another object of the invention to provide a very sensitive electronic control device which incorporates a direct coupled amplifier to magnify the change of states of a field effect transistor.

It is still another object of the present invention to provide an electronic control device for use with toys and the like which incorporates spark and hash suppressing elements to further limit the possibility of interference with radio frequency receiving apparatus.

According to one embodiment of the present invention, an electrostatic charge controlled device includes an antenna, a DC current source and a field effect transistor circuit including a field effect transistor having a gate electrode connected to the antenna and having channel electrodes connected to an output portion of the circuit, the output portion being connected across the current source. The conductive of the transistor is determined by the proximity of an electrostatic charge to the antenna. Also included, is a utilization means including a current activated device, the means being connected across the current source parallel to the output portion and being operatively coupled to the output portion and responsive to the conductive state of the field effect transistor for activating a current activated device.

The current activated device may be a conventional relay and the utilization means may also include a current amplifying circuit for increasing the sensitivity of the control device.

Where a relatively heavy electrical load is to be controlled, a second relatively heavy-duty electromagnetic relay may be connected between the load and a current supply, with the contacts of the first relay disposed in series with this load circuit. Likewise, the second relay may be of the latching type to provide a switched "on" or "off" condition, each for any desired period of time.

Those features of the present invention which are believed to be novel are set forth with particularity in the appended claims. The present invention, both as to its organization and manner of operation, together with further objects and advantages thereof, may be best understood by reference to the following description, taken in connection with the accompanying drawings in which like reference characters refer to like elements in the several views.

DESCRIPTION OF THE PREFERRED EMBODIMENTS

The invention as will be herein described utilizes a relatively new semiconductor device generally known as a field effect transistor or FET. This type of semiconductor provides a controlled current path between a source and drain electrodes commonly known as the channel. In the preferred form of this type of device, positive potential is applied to the drain and negative potential to the source whereby the negatively charged free electrons in the channel are attracted to the drain electrode to provide current flow through the channel. Without a biased potential being applied to a gate electrode, the channel is not restricted and the current flowing therethrough is limited only by the minimum resistivity of the channel itself and in the potential source circuitry. However, when a biased potential is applied or is developed at the gate, the channel is electrically restricted in its cross section and the electrons have less volume in which to move. Accordingly, the conductivity of the channel is increasingly limited with an increasing gate bias potential until essentially completely cut off. These devices are generally of the junction type (JFET) operating in what is known as a depletion mode.

In another less rugged form of this type of device, the channel is not formed and no current flows until a gate potential of either polarity is applied. Such devices are known as insulated-gate field effect transistors or IGFET's and operate in what is known as an enhancement mode.

Both of these classes of field effect devices have been extensively utilized in small signal amplifier designs, because of their high-input impedance which nearly approaches the characteristics of a vacuum tube. However, these devices have not heretofore been used as electrostatic charge sensitive control elements for electrical control devices.

Figure 1:
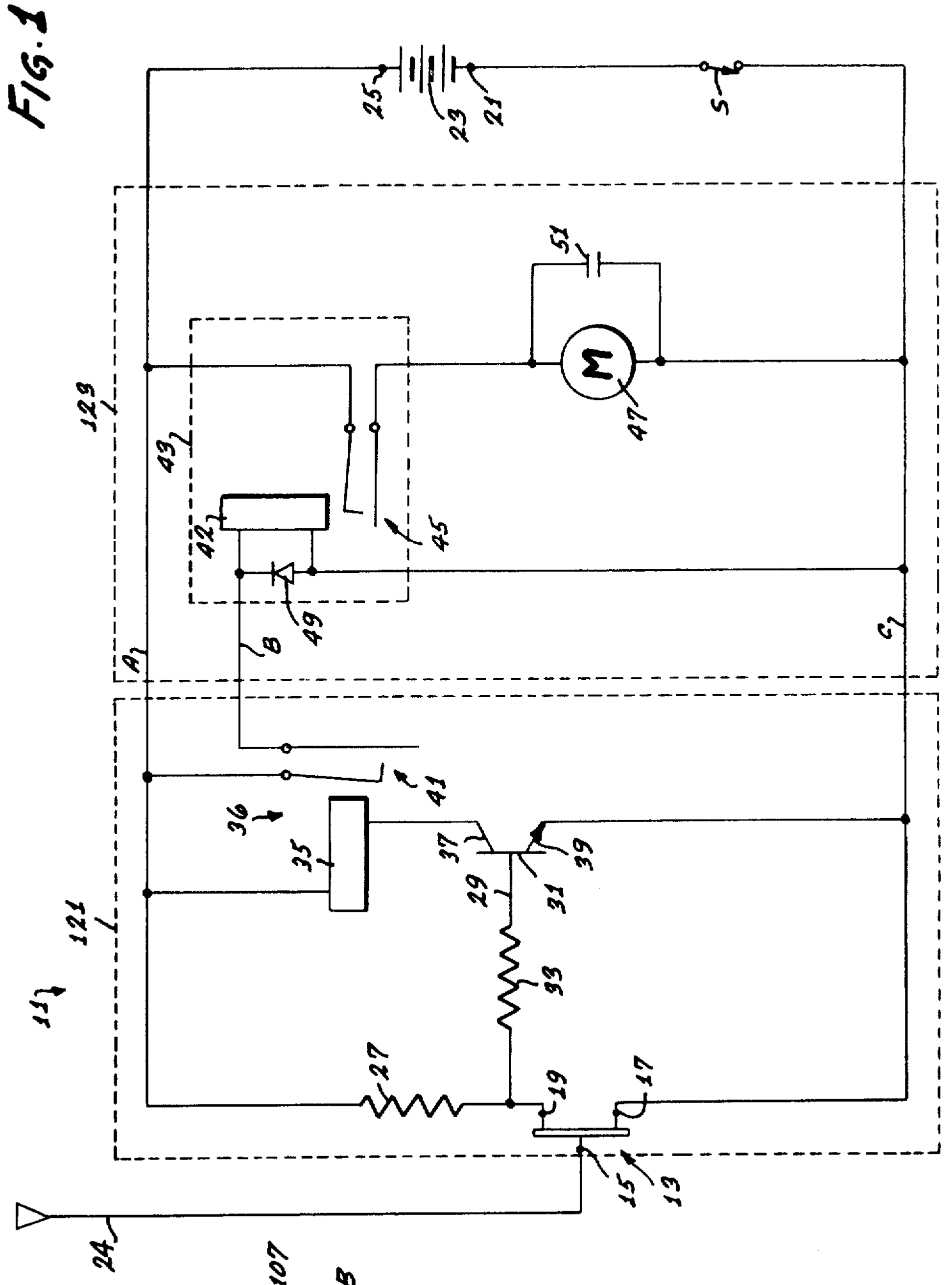
FIG. 1 is a schematic diagram of an electronic charge controlled device according to an embodiment of the invention.
Figure 6:
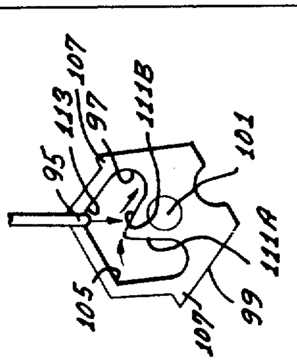
FIG. 6 is a view of an alternate position of the cam member shown in FIG. 5.

With reference to FIG. 1, there is presented a schematic diagram of a presently preferred embodiment of the invention 11. There is here shown a field effect transistor (FET) 13 such as, for example, a type Fairchild CF 24 having a gate 15, a source 17 and a drain 19. The source 17 is connected directly to a negative terminal 21 of a battery 23 and the gate 15 is connected to an antenna 24 of conductive material such as a copper plate. The drain is connected to the battery's positive terminal 25 through a load resistor 27 having an uncritical value of, for example, 3,3 kΩ, where the battery voltage is approximately 4.5 volts. The drain 19 is also connected to a base terminal 29 of a conventional NPN-transistor 31 through a base current limiting resistor 33 having a value of 10 ohms, kΩ, example. For a particular battery voltage, the resistance value of the resistor 27 may be increased sufficiently to eliminate the need for the resistor 33.

A relay coil 35 of a control relay 36 is wired in series with the collector 37 and emitter 39 of the transistor 31, across the supply voltage from the battery 23 (in parallel with the output circuit of the transistor 13), and the relays (normally open) contacts 41 are in series with a coil 42 of a mechanically latching relay 43 also disposed across the source potential. The latching relay 43 includes contacts 45 which are wired in series with a utilization device such as a direct current motor 47 between the battery terminals 21 and 25. Of course a separate source of potential may be used to drive the motor 47 when the contacts 45 are closed.

In operation, a potential is presented at the gate 15 of the FET 13 when an electrostatic charge from any charged body is placed in the vicinity of the antenna 24. This gate potential causes the current flow through the load resistor 27 to be reduced and thereby increases the base-to-emitter potential of the transistor 31. This action causes the transistor 31 to conduct more heavily between its collector and source and thereby allows a current flow through the control relay coil 35 of sufficient magnitude to cause its activation and to close the contacts 41.

The closing of these contacts completes the coil circuit of the latching relay 43 and thereby causes the contacts 45 to close and in turn completes the electrical supply current circuit of the motor 47. The removal of the electrostatic charge from the vicinity of the antenna on the other hand, removes the gate potential and allows the source-drain (channel) circuit of the FET 13 to again conduct current as limited basically by the load resistor 27. This increase of channel current reduces the potential seen between the battery's negative terminal 21 and the junction of the resistors 27 and 33 and the FET drain 19. The lowering of this voltage is seen by the base 29 and causes the transistor 31 to be cut off and the coil 35 deenergized to open the coil circuit of the latching relay 43. Because of the well-known characteristic of this type of relay, the contacts will remain closed until the relay coil is again activated.

In order to lessen the possibility of radio frequency interference caused by the generation of voltage transients from the opening and closing of a relay contact, a conventional diode 39 may be connected across the terminals of the coil 42 in a reverse polarity configuration, and a conventional hash suppressing capacity 51, of for example 500 pico farads, may be shunted across the armature winding of the motor 47 as shown.

Figures 2, 3, 4, 5:
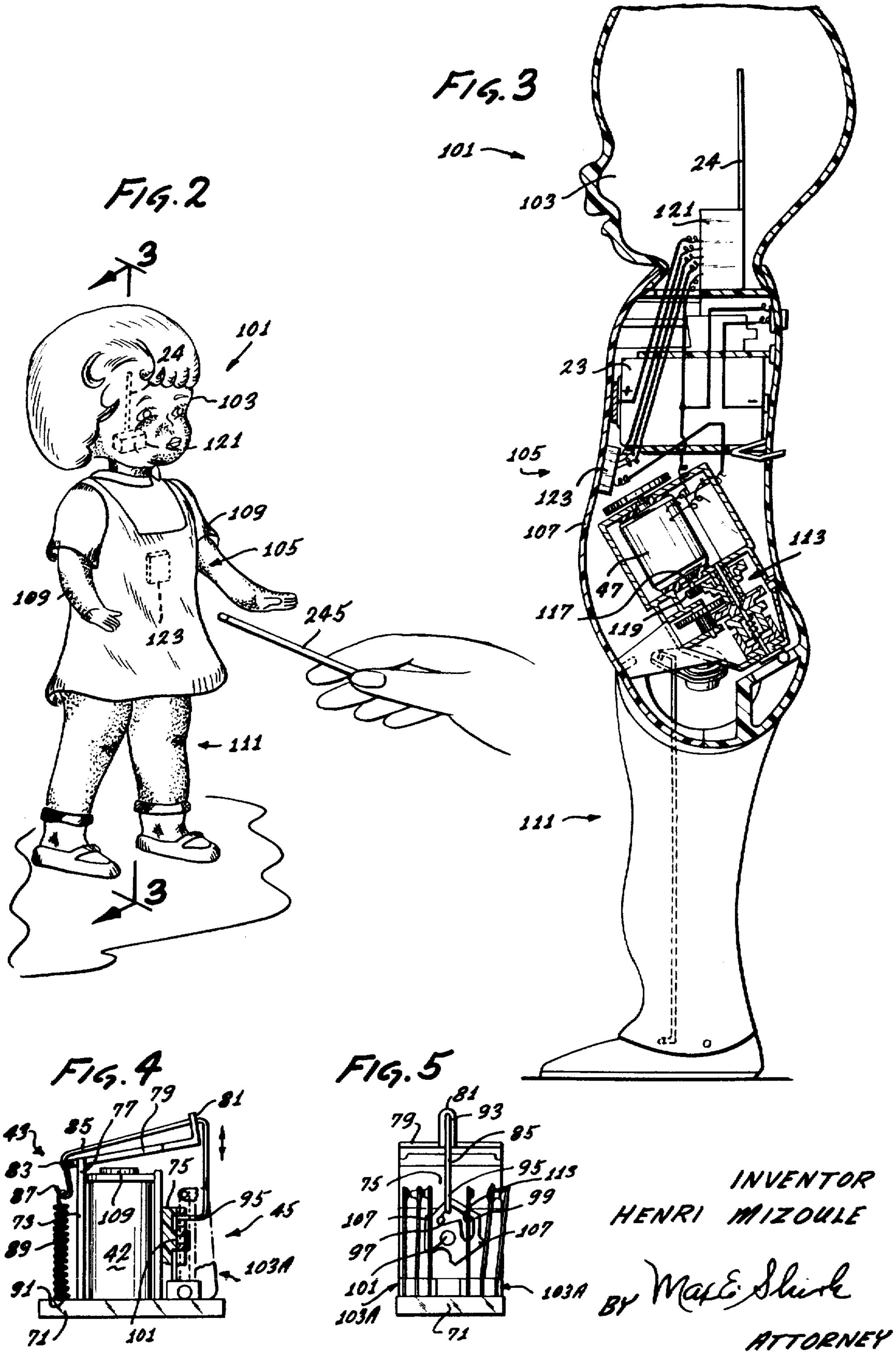
FIG. 2 is a perspective illustration of a toy doll incorporating the electronic control device shown in FIG. 1.
FIG. 3 is a cross-sectional representation of the doll shown in FIG. 2 showing the electromechanical doll movement mechanism and the electronic control device connected thereto.
FIG. 4 is an end elevational view of the latching relay shown in FIG. 1.
FIG. 5 is a front elevational view of the latching relay.

Obviously there can be an unlimited number of advantageous uses for the electronic control device as described above. One particularly advantageous use is in controlling toys because of the device's simplicity, ruggedness, compactness and its relatively inexpensive cost. Such a toy is shown in FIG. 2 in the form of a walking doll 101 having ahead 103, a body unit 105, a torso or body shell 107 and a pair of arms 109. Also included is a leg assembly 111 which is caused to move in a walking simulating relationship by an electrically driven motor assembly 113 carried within the doll's body shell 103 as best seen in FIG. 3. The motor assembly 113 includes the electric motor 47 coupled to a gear assembly 115 by the motor shaft 117 and a pinion 119. A more complete description of the doll's motivating assembly may be found in U.S. Pat. No. 3,267,608, assigned to the assignee of the present invention.

The electronic control device 11 which is disposed in a doll 101 may be divided into two basic parts—a detector —control arrangement 121 as shown in FIG. 1 by dashed lines and a motor control arrangement 123 also outlined in FIG. 1 by dashed lines. If the connection between the latching relay contacts 45 and the control relay coil 35 is designated as buss A. the connection between the other of the contacts 41 and the latching coil 42 as buss B, the connection between the motor 47 and the emitter 39 as buss C and the connection between the contacts 45 and the motor 47 as buss D, then the interconnection between the motor control arrangement 123 mounted at the center of the doll's body (FIG. 3) and the detector control arrangement 121 mounted in the head 103 thereof will be quite easily understood.

The battery supply circuit connecting the battery 23 to the motor 47 and to the electronic control device 11 is completed by manually depressing a pushbutton ON-OFF switch S, however, the motor 47 will not be energized until an electrostatically charged body such as the rod 125 is brought into the vicinity of the antenna 24 in the doll's head. A rather high potential can be generated on such a rod by rubbing it with a piece of nylon cloth or with a surface of similar material. With this configuration, it has been found that the invention provides control of such electrically operated devices as the toy doll 101 over a distance of more than 15 feet.

With reference to FIG. 4, there is shown the latching relay 43 having a coil 42 and electrical contacts 45. The coil 42 is mounted with its longitudinal axis vertically disposed with respect to a mounting base 71 and between metal base-mounted frame member 73 and 75. At the top 77 of the longer member 73, is pivotally mounted a metal plate 79 having an upturned end 81 opposite its pivot end 83. Supported over the plate 79 is a stiff wire member 85 having a first hooked end 87 for holding an end of a tension coil spring 89, the other end of which is held by a tab 91 extending from the bottom of the frame member 73. The wire member 85 extends over the top of the plate 79 through an aperture 93 in the upstanding end 81 and terminates at a second hooked or cam follower end 95.

The second end 95 rides along a specially designed double-lobed cam surface 97 in a rotatably mounted cam member 99 which is supported by a pivot post 101 extending from the frame member 75 between the two contact sets 103A and 103B of the contacts 45.

In FIG. 5, the cam member 99 is tilted to the right, the end 95 of the member 85 resting in a first corner section 105 of the cam surface 97. In this position, only one set of the contacts 103 are pressed together by one of the projections 107 extending from the member 99. When the coil 42 of the relay 43 is excited by a current flow of a predetermined magnitude, the plate 79 is drawn by the electromagnetic pull of the coil 42 toward the coil's pole piece 109. This movement forces the second end 95 of the wire member 85 to contact a first of two adjacent sloping surfaces 111A and 111B. This contact forces the cam member 99 to rotate so that when the coil 42 is deenergized, the end 95 will rest in a second corner section 113 of the surface 97. In this position, the other set of contacts 103 is forced to make contact with each individual contact element and at the same time the previously acted upon set of contacts is allowed to separate and open electrical contact. Of course, the contacts may be fabricated to open when contacted by a projection 107, and either or both sets of contacts 103 may be used in a particular electrical circuit.

It can be seen that when the relay 43 is again activated, the cam member 99 will be rotated in the opposite direction by the action of the second end 95 of the second sloping surface 111B and the configuration will be again as shown in FIG. 5.

The materials and values of components designated in the foregoing disclosure are not critical and any material or component generally known to have the same characteristics may be substituted. It is to be noted further that nearly any field effect transistor will function properly in the circuits described herein, even the most inexpensive of such devices. The type of amplifying transistor is also not critical and even those transistors having a low beta will function properly as long as it is able to handle the current necessary to cause the associated relay to function. For example, a type 2N 4400 will work satisfactorily and will provide relay coil currents up to 150 milliamps.

From the foregoing, it should be evident that the present invention creates a simple, high-sensitivity, lightweight control device which provides a means of remote control of electric equipment such as electric motors in toys.

Although specific embodiments of the invention have been described in detail, other organizations of the embodiment may be made within the spirit and scope of the invention.

Accordingly, it is intended that the foregoing disclosure and drawings shall be considered only as illustrations of principles of this invention and are not to be construed in a limiting sense.

I claim:

1. An electrostatic charge controlled toy, comprising:

a toy structure;

an antenna mounted in said structure;

a DC current source carried by said structure;

a field effect transistor circuit carried by said structure, said circuit including a field effect transistor having a gate electrode connected to said antenna and having channel electrodes connected to an output portion of said circuit, said output portion being connected across said current source, and a conductive state of said field effect transistor being determined by the proximity to said antenna of an electrostatic charge; and toy animation means including a current activated device carried by said structure, said means being connected across said current source parallel to said output portion and being operatively coupled to said output portion and responsive to the conductive state of said field effect transistor for activating said current activated device and the animation of said toy.

2. An electrostatic charge controlled toy according to claim 1, wherein said toy animation means also includes a current amplifying means having an amplifier input operatively coupled to said output portion of said circuit and having an amplifier output connected in series with said current activated device for increasing the sensitivity of said control device.

3. An electrostatic charge controlled toy according to claim 2, wherein said current amplifying means is an amplifying transistor, said input is the base terminal and said output includes the emitter and collector terminals.

4. An electrostatic charge controlled toy according to claim 3, wherein said output portion of said circuit includes a load impedance connected in series with said channel electrodes across said current source, the conductive state of said field effect transistor being evidenced by a current signal produced across said load impedance, and wherein said base terminal is electrically coupled to one of said channel electrodes, said amplifying transistor being responsive to said current signal to control the current flow to said current activated device.

5. An electrostatic charge controlled toy according to claim 1, wherein said current activated device is an electromagnetic-type device having a movable member displaceable with a change is current passing through said device.

6. An electrostatic charge controlled toy according claim 5, wherein said electromagnetic-type device is a relay having at least a pair of electrical contacts and wherein said movable member is one of said contacts.

7. An electrostatic charge controlled toy according claim 6, wherein said toy animation means further includes an electric motor and a motor exciting potential source, said electrical contacts being connected in series with said electric motor and said motor exciting potential source to control the animation of said toy.

8. An electrostatic charge controlled toy according to claim 6, wherein said relay is a latching-type relay.

* * * * *